US012789449B2

(12) United States Patent
Zhao

(10) Patent No.: US 12,789,449 B2
(45) Date of Patent: Nov. 10, 2026

(54) METHOD AND SYSTEM OF FLOW BED ASSISTED PHOTOPOLYMERIZATION BASED ADDITIVE MANUFACTURING (F-PAM)

(71) Applicant: UNIVERSITY OF PITTSBURGH—OF THE COMMONWEALTH SYSTEM OF HIGHER EDUCATION, Pittsburgh, PA (US)

(72) Inventor: Xiayun Zhao, Pittsburgh, PA (US)

(73) Assignee: University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 54 days.

(21) Appl. No.: 18/288,947

(22) PCT Filed: Apr. 29, 2022

(86) PCT No.: PCT/US2022/027034
§ 371 (c)(1),
(2) Date: Oct. 30, 2023

(87) PCT Pub. No.: WO2022/232579
PCT Pub. Date: Nov. 3, 2022

(65) Prior Publication Data

US 2024/0217172 A1 Jul. 4, 2024

Related U.S. Application Data

(60) Provisional application No. 63/181,859, filed on Apr. 29, 2021.

(51) Int. Cl.
*B29C 64/264* (2017.01)
*B29C 64/165* (2017.01)
(Continued)

(52) U.S. Cl.
CPC .......... *B29C 64/165* (2017.08); *B29C 64/245* (2017.08); *B29C 64/255* (2017.08);
(Continued)

(58) Field of Classification Search
CPC .................................................... B29C 64/264
See application file for complete search history.

(56) References Cited

U.S. PATENT DOCUMENTS

| | | | | |
|---|---|---|---|---|
| 10,953,597 | B2 * | 3/2021 | Lebrun ................. | B33Y 70/00 |
| 2016/0346997 | A1 | 12/2016 | Lewis et al. | |

(Continued)

FOREIGN PATENT DOCUMENTS

| | | |
|---|---|---|
| WO | 2020106949 | 5/2020 |
| WO | 2019195763 | 5/2021 |

OTHER PUBLICATIONS

Dendukuri et al, Continuous-flow lithography for high-throughput microparticle synthesis, Nature Materials, vol. 5, May 2006, pp. 365-369 (Year: 2006).*

(Continued)

*Primary Examiner* — Timothy Kennedy
(74) *Attorney, Agent, or Firm* — Paul D. Bangor, Jr.; Clark Hill PLC

(57) ABSTRACT

A method of additive manufacturing for creating an item, comprising (a) forming a flow bed (FB) comprising a flowing stream or layer of a carrier fluid and/or fillers; (b) depositing a layer of a precursor matrix fluid on top of the FB or below the FB to create an interface layer comprising a mixture of the precursor matrix fluid and fillers; (c) delivering a light beam patterned to a current layer of the item being added through the FB and into the interface layer to cure a portion of the interface layer in a shape of the current layer of the item being added; (d) moving the current (Continued)

layer of the item above or below the interface layer; and (e) repeating (c) and (d) for each successive layer of the item.

18 Claims, 4 Drawing Sheets

(51) Int. Cl.

| | |
|---|---|
| ***B29C 64/245*** | (2017.01) |
| ***B29C 64/255*** | (2017.01) |
| *B33Y 10/00* | (2015.01) |
| *B33Y 30/00* | (2015.01) |

(52) U.S. Cl.

CPC ............. *B29C 64/264* (2017.08); *B33Y 10/00* (2014.12); *B33Y 30/00* (2014.12)

(56) References Cited

U.S. PATENT DOCUMENTS

| | | | |
|---|---|---|---|
| 2017/0028618 A1* | 2/2017 | Robeson | B29C 64/129 |
| 2017/0057164 A1 | 3/2017 | Hemphill et al. | |
| 2018/0214949 A1 | 8/2018 | Martin et al. | |
| 2018/0290380 A1* | 10/2018 | Rehrig | B28B 1/001 |
| 2018/0326488 A1 | 11/2018 | Lappas et al. | |
| 2021/0016505 A1* | 1/2021 | Jau | B33Y 30/00 |
| 2022/0001612 A1* | 1/2022 | Zhao | B33Y 30/00 |

OTHER PUBLICATIONS

Form PCT/ISA/220, PCT Notification of Transmittal of the International Search Report and the Written Opinion of the International Search Authority, or the Declaration, PCT/US2022/027034, Date Mailed Oct. 4, 2022.

Form PCT/ISA/210, PCT International Search Report for International Application No. PCT/US2022/027034, Date Mailed Oct. 4, 2022.

Form PCT/ISA/237, PCT Written Opinion of the International Searching Authority for International Application No. PCT/US2022/027034, Date Mailed Oct. 4, 2022.

* cited by examiner

METHOD AND SYSTEM OF FLOW BED ASSISTED PHOTOPOLYMERIZATION BASED ADDITIVE MANUFACTURING (F-PAM)

RELATED APPLICATION

This application claims priority benefit under 35 U.S.C. § 119(e) of U.S. Provisional Application No. 63/181,859 filed Apr. 29, 2021 entitled METHOD AND SYSTEM OF FLOW BED ASSISTED PHOTOPOLYMERIZATION BASED ADDITIVE MANUFACTURING (FB-PAM), the contents of which are herein incorporated by reference for all purposes.

FIELD OF THE DISCLOSURE

Technical Field

The present disclosure generally relates to the field of additive manufacturing.

Background of the Disclosure

Additive manufacturing (AM), a category of technologies based on layer-wise net or near net shaping processes, is known for its potential low cost and high value. For composites manufacturing, it offers a promising avenue to reduce fabrication steps, time, and cost, enable shape complexity and geometry intricacy, and improve infill density. Despite recent interest and various effort in AM of composites, AM is still immature and incapable of manufacturing composites at production scale due to the low printing speed, small build area, and underdeveloped postprocessing. For example, there is a scarcity of progress or breakthrough towards high-speed AM of ceramics matrix composites (CMCs). Hitherto, there still lacks an advanced AM method with both a rapid matrix printing process and a capable filler embedding mechanism, which are critical in developing an AM based high-throughput high-performance composites production technology.

Photopolymerization based AM (PAM) solidifies light-absorptive liquid resin into a 3D part and has evident advantages in fabrication flexibility, printing speed, geometric accuracy and surface finish [1]. A variety of PAM technologies such as stereolithography (SLA) and digital light processing (DLP) are adopted in industries for three-dimensional (3D) parts production primarily due to the distinct advantages of photopolymerization—high spatiotemporal precision, high production rate and room temperature environment [2-5]. Conventionally, researchers apply PAM to process various slurries of photoresin and particulates (e.g., carbon nanotube, graphene oxide, aluminum oxide nanowires, and functional particles) to obtain polymer-based composites (PMCs) with enhanced strength and electrical conductivity [6]. These traditional S-PAM based composites manufacturing methods are confronted with challenges of sedimentation phenomena, homogeneous dispersion, or alteration of printability due to the fillers being added into photopolymer resin [7]. Another challenge of using PAM to fabricate composites stems from the fillers agglomeration and interactions of light and fillers [6]. While PAM for PMCs or metal matrix composites (MMCs) is immature, applying the PAM method for fabricating CMCs is far less developed and not yet established or used in industrial processes. For example, one recent study used a DLP process to photopolymerize a siloxane(SiOC)-based preceramic resin containing inert ceramic reinforcement fillers (e.g., mullite, Al2O3, Si3N4 particles, and SiC whiskers) for SiOC based CMCs, demonstrate that PAM can fabricate free-form high-performance CMCs with enhanced toughness and strength that are comparable with traditionally processed ceramics [8]. Yet, such a conventional S-PAM method is especially not suitable to print SiC whiskers reinforced CMCs due to SiC's high refraction index and low UV transparency, which would cause extremely low cure depth (~15 μm) and severely limit the print speed and interlayer adhesion strength. Besides, the reported method cannot control fiber orientation in matrix to further toughen the resulted CMCs.

Hitherto, a rapid and well-controlled filler deposition method which can be easily manipulate the orientation and load of fillers during PAM is lacking in the art. Researchers have employed acoustic or magnetic or electric fields to pattern particulates during projection stereolithography (SLA) of liquid photopolymer resin to obtain PMCs [9-13]. These methods require functional nanoparticle suspensions that can respond to external stimulus fields. It remains questionable whether such methods can nimbly or effectively orient, align, and deposit regular fillers in a matrix material, especially those with complex mixtures and higher volume fraction load. It also remains challenging to print composites parts with large areas.

BRIEF SUMMARY OF THE DISCLOSURE

The present disclosure is directed to a method and system of Flow Bed assisted Photopolymerization based Additive Manufacturing (FB-PAM), which can provide a cost-effective high-throughput photopolymerization based additive manufacturing (AM, or 3D Printing) process for fabricating diverse products including multi-material components as well as various hybrid materials and composites such as functionally gradient materials (FGM), ceramics matrix composites (CMCs), polymer matrix composites (PMCs), and metal matrix composites (MMCs). The FB-PAM method employs a filler-laden flow bed (FB), i.e., a layer of fluid (e.g., fluorinated oil) to carry and deposit fillers (e.g., particles, fibers, whiskers, and other reinforcing or functional materials) from beneath a layer of light-induced curable (by effects of photon and or thermal, etc.) matrix material so that fillers can be attracted into a light-induced curing volume and or surface during a photopolymerization based additive manufacturing (PAM) process, thereby forming a product of multi-material part or a composite material. One unique advantage of the FB-PAM of the present disclosure lies in its ability to accurately control the matrix geometry as well as easily adjust the composition and flow condition of the FB to deposit a broad range of fillers in desired patterns (e.g., composition, orientation, and alignment), thereby leading to a product with desired matrix structure, complex filler architecture (e.g., heterogeneity and topology), and proper filler/matrix interfacial bonding. Equally important, the FB, especially the carrier fluid, of the present disclosure preferably plays two additional advantageous roles. First, it preferably provides an isolating zone to reduce or even eliminate the adhesion between the fabricated workpiece and light window, thereby enhancing fabrication speed. Second, it preferably serves as a cooling medium to dissipate the exothermal process induced heat, thereby allowing large format 3D printing. The FB-PAM method of the present disclosure also preferably overcomes the issues of low print speed and limited material choices in the state-of-the-art AM methods, such as the suspension vat photopolymerization based AM (S-PAM) method that suffers from high viscosity and low light penetration and those acoustic or magnetic or electric field enabled PAM methods that demand correspondingly stimuli-responsive materials. Moreover, for CMCs fabrication, the integrated facile FB-PAM method of the present disclosure can outperform existing methods such as polymer infiltration and pyrolysis (PIP), which are costly, time-consuming, having relatively higher process temperature, and operationally complexity involving multiple and repeated steps. Overall, the novel use of a FB in the FB-PAM of the present disclosure beneficially enables a rapid and dynamical tuning of material formulation and hydrodynamic conditions for filler deposition and also reduces the separation force and process temperature during the matrix curing, resulting in improved product properties (e.g., accurate filler/matrix geometry and strength), enhanced fabrication speed, increased printable area, and expanded portfolio of processable materials.

In a preferred aspect, the present disclosure comprises a method of additive manufacturing for creating an item, comprising: (a) forming a flow bed (FB) comprising a flowing stream or layer of a carrier fluid and/or fillers; (b) depositing a layer of a precursor matrix fluid on top of the FB or below the FB to create an interface layer comprising a mixture of the precursor matrix fluid and fillers; (c) delivering a light beam patterned to a current layer of the item being added through the FB and into the interface layer to cure a portion of the interface layer in a shape of the current layer of the item being added; (d) moving the current layer of the item above or below the interface layer; and (e) repeating (c) and (d) for each successive layer of the item.

In another preferred aspect, a method of additive manufacturing for creating an item of the present disclosure further comprises adjusting one or more parameters, such as flow direction, flow speed, flow material type and composition of the flowing stream or layer of the FB to orient fillers in the carrier fluid with respect to a reference point.

In yet another preferred aspect of a method of additive manufacturing for creating an item of the present disclosure, the fillers comprise particles, fibers, whiskers, additives, colorants and/or other reinforcing or functional materials.

In another preferred aspect of a method of additive manufacturing for creating an item of the present disclosure, the item comprises a multi-material component, a hybrid material, a composite material, a functionally gradient material (FGM), a ceramic matrix composite (CMC), a polymer matrix composite (PMC), or a metal matrix composite (MMC).

In yet another preferred aspect of a method of additive manufacturing for creating an item of the present disclosure, the carrier fluid comprises a fluorinated oil or other materials.

In yet an additional preferred aspect of a method of additive manufacturing for creating an item of the present disclosure, a matrix geometry of the current layer of the item being added is controlled or adjusted by adjusting the composition and flow condition(s) of the FB to deposit one or more fillers in desired patterns in terms including composition, orientation, and/or alignment to construct the item with a desired matrix structure, complex filler architecture in terms including heterogeneity and/or topology, and/or proper filler/matrix interfacial bonding.

In yet another preferred aspect of a method of additive manufacturing for creating an item of the present disclosure, the FB flows over a light window through which the light beam passes and wherein the FB provides an isolating zone that reduces or eliminates adhesion between the current layer of the item being added and the light window thereby enhancing a speed at which the item is produced.

In another preferred aspect of a method of additive manufacturing for creating an item of the present disclosure, the FB serves as a cooling medium to dissipate exothermal heat from the curing of the current layer of the item being added thereby allowing large format 3D printing.

In yet another preferred aspect, a method of additive manufacturing for creating an item of the present disclosure further comprises replacing and/or replenishing the precursor matrix fluid after the current layer of the item being added is cured.

In another preferred aspect, a method of additive manufacturing for creating an item of the present disclosure further comprises rotating a materials chamber containing the precursor matrix fluid and the FB after the current layer of the item being added is cured in order to change an orientation of the fillers in the FB with respect to the fillers in the current layer just added to the item.

In yet another preferred aspect of a method of additive manufacturing for creating an item of the present disclosure, the FB comprises a mixture of carrier fluid and fillers prior to step (c) and carrier fluid only during step (c) while the current layer of the item being added is cured by the light beam.

In another preferred aspect of a method of additive manufacturing for creating an item of the present disclosure, the precursor matrix fluid comprises one or more of a preceramic polymer, a photopolymer, a photoinitiator, a binding monomer/oligomer, and precursor matrix material which may comprise a preceramic polymer for ceramic matrix, a matrix monomer/oligomer, and/or a metal-cross-linked hydrogel.

In a further preferred aspect of a method of additive manufacturing for creating an item of the present disclosure, the FB comprises one or more constituents selected from filler surfactants, functional groups, and/or special additives, to enhance the performance of the method of additive manufacturing for creating an item and/or the properties and functionalities of resulting products.

In another preferred aspect of a method of additive manufacturing for creating an item of the present disclosure, the FB flows into and out of a materials chamber in which the method of additive manufacturing for creating an item is carried out.

In yet another preferred aspect of a method of additive manufacturing for creating an item of the present disclosure, an electric pump is used to move the flow of the FB into and out of the materials chamber and to continuously replenish the FB.

In another preferred aspect of a method of additive manufacturing for creating an item of the present disclosure, a density of the precursor matrix material is smaller or greater than that of the FB and the precursor matrix material is immiscible with the FB, so that the FB can settle beneath or flow above the interface layer.

In yet another preferred aspect of a method of additive manufacturing for creating an item of the present disclosure, a continuous filler or filament feeding process is used to fabricate continuous filler composites, long filler composites or continuous fiber composites.

In another preferred aspect of a method of additive manufacturing for creating an item of the present disclosure, the flow bed is programmed to transport different fillers and/or carrier fluids to enable depositing different fillers into the matrix.

In another preferred aspect, the present disclosure comprises a system for additive manufacturing for creating an item, comprising: light source to provide photo and/or thermal energy to cure a precursor matrix fluid layer by layer; a digital mask generator to pattern a beam from the light source to shape each layer through a transparent substrate; a projection optic to ensure, or enhance the image quality of the digital masks; a materials chamber which hosts a layer of precursor matrix fluid disposed on top of a FB comprising a flowing stream or layer of a carrier fluid and/or fillers; a movable build platform that can move with respect to the materials chamber to allow a layer-by-layer matrix curing and filler deposition with a build head holding a cured portion of the item being built.

In another preferred aspect, a system for additive manufacturing for creating an item of the present disclosure further comprises a rotational stage to rotate the materials chamber to change an orientation of the fillers in the FB with respect to a point of reference.

In yet another preferred aspect of a method of additive manufacturing for creating an item of the present disclosure, the point of reference is on the build platform or on the cured portion of the item being built on the build platform.

In another preferred aspect of a method of additive manufacturing for creating an item of the present disclosure, the digital mask generator comprises a digital micromirror device and/or a spatial light modulator.

DETAILED DESCRIPTION

Method of FB-PAM

Preferred embodiments of the FB-PAM method of the present disclosure overcome the deficiencies of prior PAM methods by employing a filler-laden flow bed (FB), i.e., a layer of fluid (e.g., fluorinated oil), to carry and deposit fillers (e.g., particles, fibers, whiskers, and other reinforcing or functional materials) from beneath a layer of light-induced curable (by effects of photon and or thermal, etc.) matrix material so that fillers can be attracted into a light-induced curing volume and or surface during a photopolymerization based additive manufacturing (PAM) process, thereby forming a product of multi-material part or a composite material. Preferably, the FB-PAM process of the present disclosure consists of two synergetic processes: hydrodynamic assisted filler deposition (HydroFD) and photo-induced matrix curing (PhotoMC). One unique advantage of the FB-PAM of the present disclosure lies in its ability to accurately control the matrix geometry as well as easily adjust the composition and flow condition of flow bed to deposit a broad range of fillers in desired patterns (e.g., composition, orientation, and alignment), thereby leading to a product with desired matrix structure, complex filler architecture (e.g., heterogeneity and topology), and proper filler/matrix interfacial bonding. Equally important, preferred flow bed and carrier fluid of the present disclosure provide two additional advantageous roles. First, preferred flow bed and carrier fluid of the present disclosure provide an isolating zone to reduce or even eliminate the adhesion between the fabricated workpiece and light window, thereby enhancing fabrication speed. Second, the flow bed and carrier fluid of the present disclosure preferably serve as a cooling medium to dissipate the exothermal process induced heat, thereby allowing large format 3D printing.

Preferably, a process planning or control method according to the present disclosure with suitable parameters in both the HydroFD and PhotoMC processes so that their interactions are incorporated. The flow bed composition and channel design (shape and size), the HydroFD process parameters (e.g., filler flow speed and direction), and the PhotoMC process parameters (e.g., layer thickness, and exposure intensity) of preferred FB-PAM methods of the present disclosure are optimized to attain desired product properties.

Overall, the FB-PAM method of the present disclosure incorporates a preferred and novel use of a flow bed, which not only enables a rapid and dynamical tuning of material formulation and hydrodynamic conditions for filler deposition but also reduces the separation force and process temperature during the matrix curing, resulting in improved product properties (e.g., accurate filler/matrix geometry and strength), enhanced fabrication speed, increased printable area, and expanded portfolio of processable materials.

FB-PAM Process Workflow

Figure 1:
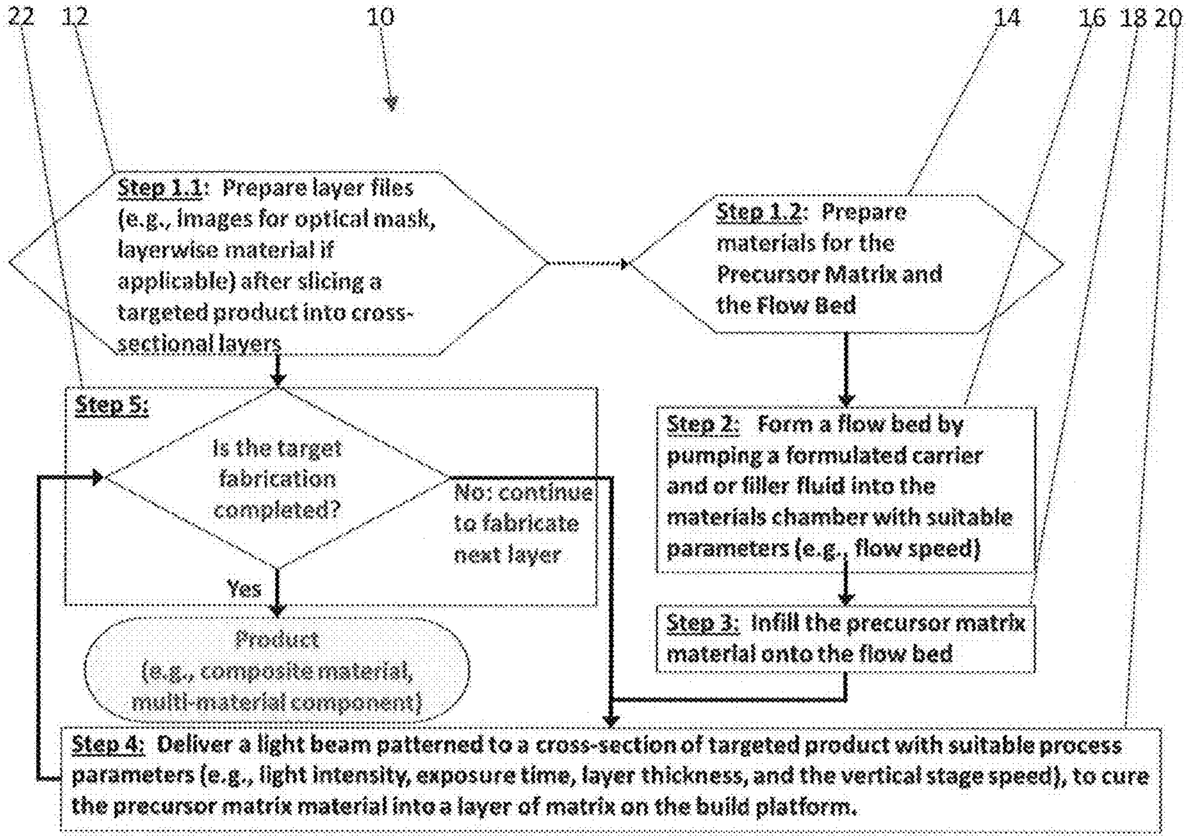
FIG. 1 shows a flow chart for a preferred basic process for a flow bed assisted photopolymerization based additive manufacturing (FB-PAM) method of the present disclosure.
Figure 2:
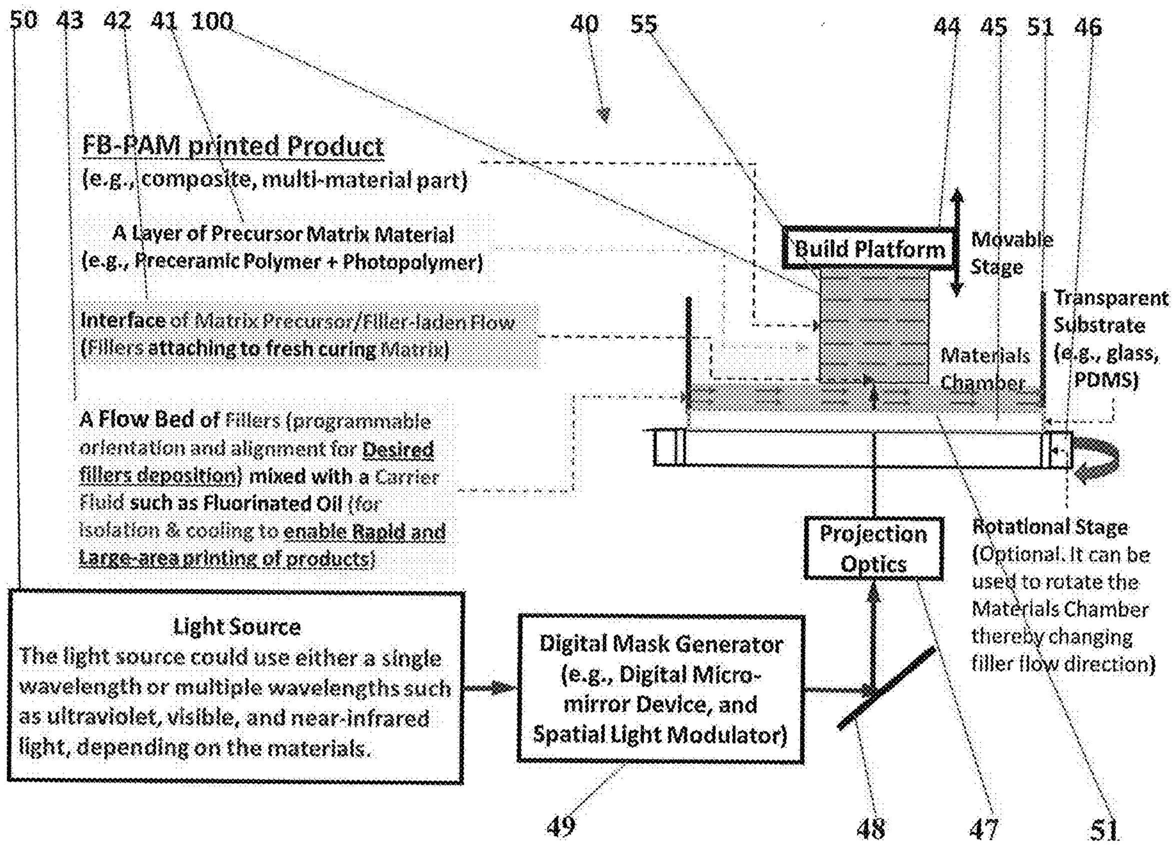
FIG. 2 is a schematic illustration of a preferred system and method of flow bed assisted photopolymerization based additive manufacturing (FB-PAM) of the present disclosure for fabricating products (e.g., multi-material components and composites) wherein the fillers preferably may be any form or shape including particles, fibers, and whiskers.

A workflow of a preferred FB-PAM process 10 of the present disclosure to fabricate a target product consists of the following steps as shown in FIGS. 1 and 2.

- Step (1.1) at 12: Prepare layer files (e.g., images for optical mask, layer-wise materials if applicable) after slicing a targeted composite part into cross-sectional layers.
- Step (1.2) at 14: Prepare materials for the precursor matrix 41 and the flow bed 43.
- Step (2) at 16: Form a flow bed (FB) 43 by pumping a formulated carrier and or filler fluid into the materials chamber 51 with suitable parameters (e.g., flow speed). During the HydroFD process according to the present disclosure, the fillers will be aligned in response to the flow pattern (e.g., direction, laminar, and speed) by the shear stress from the interface between the precursor matrix layer 41 and the flow bed 43.
- Step (3) at 18: Infill the precursor matrix material 41 into or onto the flow bed 43 from above or below the FB 43 depending on the properties (e.g., density) of material systems and the PAM system setup (e.g., light source being below or above precursor matrix material 41).
- Step (4) at 20: Deliver a light beam 52 patterned to a cross-section of targeted part with suitable process parameters (e.g., light intensity, exposure time, layer thickness, and the vertical stage speed), to cure the precursor matrix material 41 into a layer of matrix on the build platform 44.
- Step (5) at 22: Repeat Step (4) and print a part 100 layer by layer.

FIG. 1. A Workflow for a Preferred Basic Process 10 for Flow Bed assisted Photopolymerization based Additive Manufacturing (FB-PAM) Method of the Present Disclosure.

According to the present disclosure, variations of the basic workflow above to implement the FB-PAM process of the present disclosure preferably include, without limitation, the following possible modifications. These additional process steps can be used in combination or individually to enhance the FB-PAM of the present disclosure for advanced composites and parts.

- Advanced Process Workflow—Example #1: In Step (5) at 22 above, a process of replacing and or replenishing the precursor matrix material 41 occurs before printing a subsequent layer.
- Advanced Process Workflow—Example #2: In Step (5) at 22 above, a process of rotating the entire materials chamber 51 occurs before printing a subsequent layer, in order to change a fiber orientation.
- Advanced Process Workflow—Example #3: The FB 43 preferably is programmed to transport a carrier fluid only while curing a matrix layer (i.e., during the PhotoMC process) and switches to transport a filler loaded carrier fluid to deposit filler at the interfacial surface 42 (i.e., during the HydroFD process). The FB 43 with alternating flows (i.e., a carrier fluid and a filler loaded carrier fluid) aims to reduce the filler's possible effects on an optical mask's intensity profile and geometrical accuracy of projected layer images during PhotoMC in Step (4) above. Meanwhile, it allows the process to flow in a layer of carrier fluid only, which won't give rise to optical distortion while continuing to serve as an isolation and or cooling layer between the printing surface and the light window.
- Advanced Process Workflow—Example #4: The FB 43 preferably is programmed to transport different fillers and or carrier fluids. This feature will enable depositing different fillers into the matrix.
- Advanced Process Workflow—Example #5: A continuous filler feeding process preferably is incorporated into the FB-PAM process of the present disclosure to fabricate continuous or long filler composites (e.g., continuous fiber composites). An online filler cutting process might be adopted to deposit continuous or long fillers into the matrix.
- Advanced Process Workflow—Example #6: The FB 43 preferably is formulated with purposed constituents, such as filler surfactants, functional groups, and special additives, to enhance the performance of FB-PAM and or the properties and functionalities of resulting products.

System of FB-PAM

Figure 3:
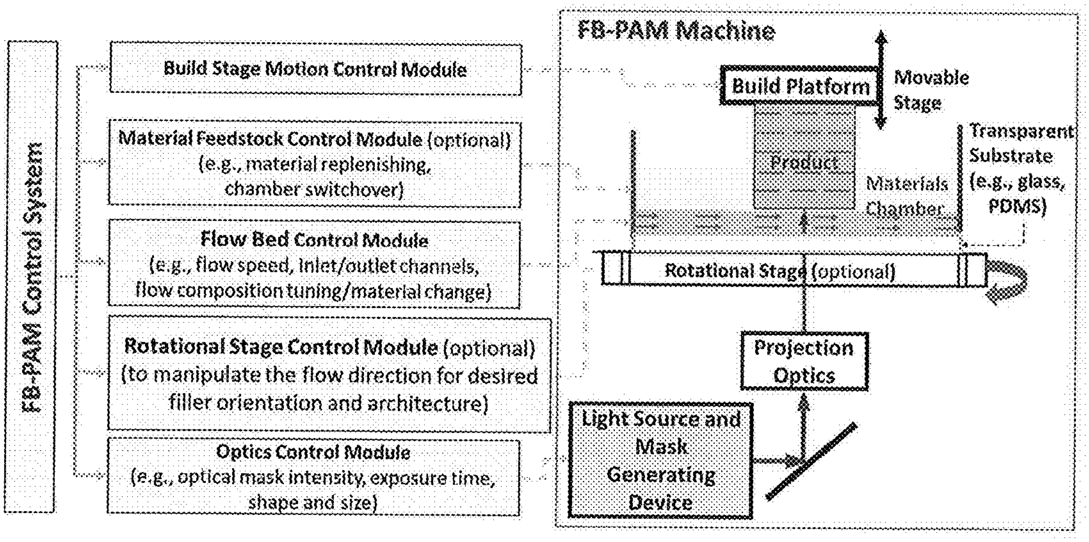
FIG. 3 is a schematic illustration of a preferred control system and method for flow bed assisted photopolymerization based additive manufacturing (FB-PAM) of the present disclosure.

As shown in FIGS. 2 and 3, a FB-PAM system 40 of the present disclosure preferably comprises of (1) light source 50 (single, or multiple wavelengths) to provide photo and or thermal energy to cure a precursor matrix material 41 layer by layer; (2) digital mask generator 49 (e.g., Digital Micromirror Device, and Spatial Light Modulator) to pattern the light source beam 52 to shape each layer from reflector 48 and through transparent substrate 45; (3) projection optics 47 to ensure, or enhance the image quality of the digital masks; (4) a materials chamber 51 which hosts the layer of matrix material 41 and the layer of fiber flow 43; (5) a build platform 44 that can move to allow a layer-by-layer matrix curing and filler deposition with a build head holding a cured product, and (6) an optional rotational stage 46 to rotate the materials chamber 51 thereby changing fiber direction within the cured matrix material and realizing desired filler arrangements layer by layer.

A preferred FB-PAM system of the present disclosure preferably deposits discrete fillers. Another preferred and more sophisticated version of FB-PAM system of the present disclosure deposits continuous or long fillers (e.g., continuous fibers) by designing and incorporating a continuous filler feedstock and layer-wise filler cutting mechanism and module.

FIG. 2 shows a schematic illustration of a preferred system and method of Flow Bed assisted Photopolymerization based Additive Manufacturing (FB-PAM) of the present disclosure for fabricating products (e.g., multi-material components and composites). The fillers preferably may be any form or shape including particles, fibers, and whiskers.

3.1 Precursor Matrix Material System

A precursor matrix material system of the present disclosure preferably comprises suitable photoinitiators, binding monomers/oligomers, and precursor matrix material (e.g., preceramic polymers for ceramic matrix, monomers/oligomers for polymer matrix, and metal-crosslinked hydrogel for metal matrix). Preferably, the density of the precursor matrix material is smaller than that of the FB 43 and the precursor matrix material is immiscible with the FB, so that the FB 43 can settle beneath the print interface 42 and steadily supply fillers during the matrix curing.

3.2 Material System for Flow Bed

Preferably for a provided a filler material, the associated carrier fluid is selected accordingly, to (1) allow the fillers to flow beneath the precursor matrix materials 41, (2) display suitable optical properties to transmit the light beams 52 upward to the matrix material zone 41, (3) possess suitable rheological properties to be able to generate desired flow patterns (e.g., laminar flows), and (4) be immiscible with the precursor matrix material and not to not to dissolve the printed parts. Material composition for the FB 43 preferably is formulated with an optimal filler loading level to afford these necessary properties (e.g., adequate transparency) for rapid and accurate photopolymerization of the matrix material(s) and the composite(s). Suitable surfactants (e.g., fluorinated and amine functionalized surfactants) can be used to enable desired dispersion of filler within the carrier fluid. The choice of surfactants preferably depends on the properties of the filler and carrier fluid.

3.3 Materials Chamber

Preferably, the materials chamber 51 can have a variety of designs to (1) hold a layer of precursor matrix material 41, and (2) enable the mixture of carrier fluid and filler which preferably can flow through the bottom zone of the materials chamber 51 and from beneath the matrix material zone 41.

The materials chamber 51 can be designed to have additional features including but not limited to the following.

The materials chamber 51 may have a material replenishing system that can replace and or refill the materials.

The FB-PAM system preferably may allow a switch between different flow beds 43 for depositing different fillers or other purposes. Preferably, materials chamber 51 can be designed accordingly to enable flowing different fillers and or carrier fluids.

The FB-PAM system preferably may employ multiple materials chambers 51 that can be coordinated to print composites with multiple matrix materials 41 by switching the materials chamber 51 for a different matrix material(s) 51 at different layers 55.

A working materials chamber 51 preferably may be rotated by a rotational stage 46, in order to change the filler flow direction thus the filler orientation in the matrix 41, achieving a composite with varying or optimal filler orientation at different layers 55 if needed.

Process Control

A preferred FB-PAM process control system of the present disclosure consists of the following main items described below. FIG. 3 shows a schematic illustration of a preferred control system and method for FB-PAM of the present disclosure.

A control module for optics (e.g., optical mask intensity, exposure time, shape and size), build platform 44 (e.g., build stage movement), flow bed 43 (e.g., flow speed, inlet/outlet channels switch, flow composition tuning, and flow material changeover), and other add-on systems (e.g., material replenishing, chamber switchover, and chamber rotation), respectively. The rotational stage control can be used to manipulate the flow direction for desired filler orientation and architecture. A master controller that will coordinate all the control modules as listed above to enable a synergetic FB-PAM process. Methods, algorithms, protocols, and equipment for process planning, optimization, and or control, which will provide guidance and commands to a FB-PAM system with suitable machine settings and process parameters. An integrated system of hardware and software can be developed to control the FB-PAM system and process.

In-Situ Process Monitoring

An in-situ monitoring system preferably may be combined with an FB-PAM system according to the present disclosure to assure process accuracy and aid process control. It preferably may consist of a single or multiple sensors to monitor or measure key process parameters and machine/environment conditions. The in-situ sensing or measurement data can be used to provide feedback for a potential closed-loop process control. For example, a digital particle imaging velocimetry preferably may be used to analyze the cross-sectional fluid flow profile and the fillers orientation and alignment [14].

Example Application of FB-PAM

The FB-PAM method of the present disclosure can overcome the bottleneck issues induced by traditional slurry PAM methods which are confronted with low light penetration and high viscosity challenges, leading to a capable method of manufacturing multi-material components or composites with high speed and large format printing ability. Moreover, for CMCs fabrication, the integrated FB-PAM method of the present disclosure can outperform existing methods such as polymer infiltration and pyrolysis (PIP), which are costly, time-consuming, operationally complex, and involve multiple or even repeated steps. Ceramic matrix composites (CMCs) feature appealing properties such as light weight, thermal resistance, and fracture toughness, over traditional ceramics and metal alloys. CMC names include a combination of type of fiber/type of matrix (e.g., SiC/SiC stands for silicon-carbide-reinforced silicon carbide).

Additionally, the FB-PAM method of the present disclosure can offer a much-desired rapid production technology to fabricate SiC/SiC composites for various applications such as the high temperature applications. Specifically, a preceramic polymer that can be cured to derive SiC ceramic matrix will be mixed with a photopolymer resin to form a precursor matrix material 41. Fluorinated oil can be mixed with SiC fibers that are coated with some surfactants to form a fiber FB 43. The materials chamber 51 preferably will be capable of transporting, orienting, and aligning the fibers beneath the curing matrix 42. The method of FB-PAM of the present disclosure preferably can be implemented to fabricate SiC/SiC composites layer by layer.

Conventionally, fiber coatings are employed in conventional CMCs manufacturing to prevent damages by the exothermic reactions and to provide weak interface for debonding and composite toughness. The FB-PAM method of the present disclosure is advantageous in that it preferably operates at relatively low temperatures and can alleviate the common problems that arise from inadequate fiber coating and high-temperature instability of fibers used in conventional CMCs fabrication.

Factual Data

Figure 4:
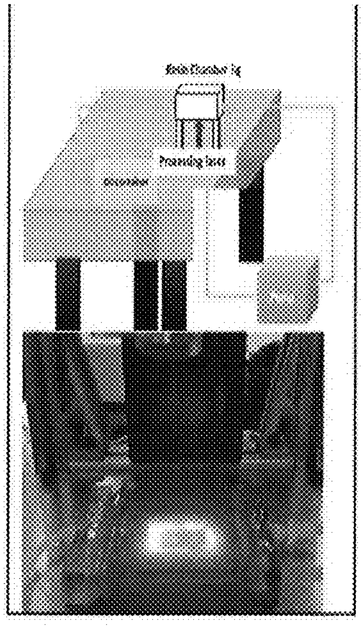
FIG. 4 shows a preferred embodiment of a FB-PAM system of the present disclosure showing flow bed in materials chamber working on the curing stage with PTFE oil, exposure mask of a test bar is shown, and a coupon is printed.

This section presents the factual data related to the example application in the previous section. First, a prototyping FB-PAM system was designed and built at the inventor's laboratory. FIG. 4 shows the schematic and the actual setup employed for a composite sample fabrication.

FIG. 4 shows a preferred embodiment of a FB-PAM system according to the present disclosure where the materials chamber is working on the curing stage with PTFE oil, exposure mask of a test bar is shown, and a coupon is printed.

Figure 5:
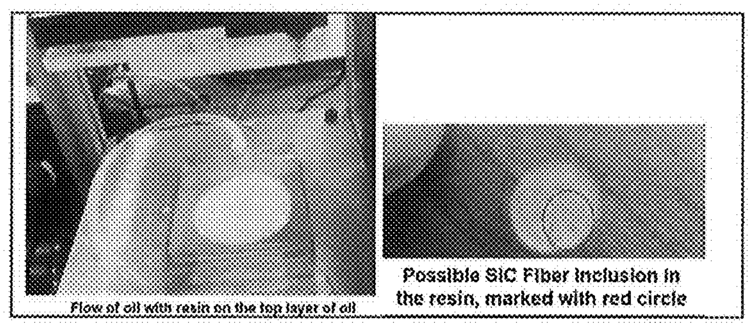
FIG. 5 shows a preferred embodiment of a FB-PAM system of the present disclosure and initial demonstration of using such preferred FB-PAM system to fabricate a green composite part.

An embodiment of a system of the present disclosure is shown in FIG. 5, where the prepolymer resin (formulation adapted from [15]) was cured on top of a mixed flow of fluorinated oil and SiC fibers (diameter: 0.5 μm; length: 60 μm). The SiC fibers when mixed with oil exhibited some form of coagulation. The cohesion among particles is preferably reduced by addition of surfactants for proper mixing and alignment to obtain better outcome in FB-PAM. It was observed that the SiC fibers can be successfully embedded into the matrix, validating the feasibility of FB-PAM. FIG. 5 shows a preferred embodiment of a FB-PAM system of the present disclosure and initial demonstration of using FB-PAM to fabricate a green composite part.

Figures 6A, 6B, 6C, 6D, 6E, 6F, 6G, 6H:
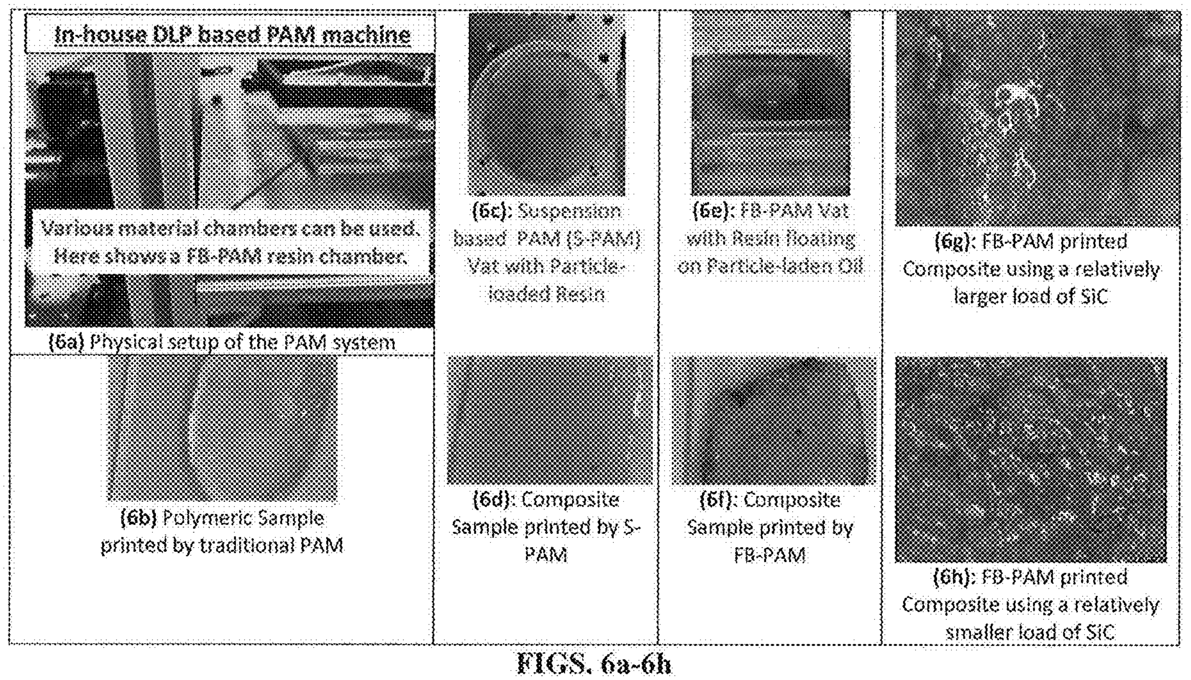
FIG. 6*a* shows a proof-of-concept setup for verifying the feasibility FB-PAM method of the present disclosure with a lab-designed Digital Light Processing (DLP) based FB-PAM system.
FIG. 6*b* shows a baseline sample of a polymeric part printed out of liquid resin as in a traditional Photopolymerization based Additive Manufacturing (PAM) method wherein no particles are seen in the sample.
FIGS. 6*c* and 6*d* show a comparison experiment of printing polymer matrix composite (PMC) via a traditional suspension based PAM (S-PAM) method.
FIGS. 6*e* and 6*f* show the validation of printing PMC via a preferred method of FB-PAM of the present disclosure.
FIGS. 6*g* and 6*h* show more FB-PAM composite samples printed via a preferred method of FB-PAM of the present disclosure and their Keyence optical microscope images (160×) wherein more or denser particles are observed in the composite sample of FIG. 6*g* that used a relatively larger load of SiC fibers than the sample shown in FIG. 6*h*, indicating that the FB-PAM process of the present disclosure is capable of tuning the filler fraction for composite fabrication.

Furthermore, three sets of experiment were conducted using an in-house DLP based PAM machine as shown in FIG. 6*a*. Experiment Set 1 as shown in FIG. 6*b*: A polymeric part was printed out of a lab-prepared photosensitive resin (adapted from [15]) by implementing the PAM setup in a traditional way as commercial DLP machines. Experiment Set 2 as shown in FIGS. 6*c* and 6*d*: A polymer matrix composite was printed out of a mixture of resin (from the same batch as used in Set 1) and SiC fibers (diameter: 0.5 μm; length: 60 μm) by implementing a conventional S-PAM process. Experiment Set 3 as shown in FIGS. 6*e*, 6*f*, 6*g* and 6*h*: Several polymeric matrix composite samples were printed by implementing the FB-PAM process of the present disclosure with different loads of SiC fibers (from the same batch as used in Set 2), where a static flow bed consisting of fluorinated oil and SiC fibers was placed beneath resin (from the same batch as used in Set 1 and Set 2). Ideally, by design the FB should provide a mobile interface and shear stress for fulfilling its roles including serving as a cooling medium and a vehicle for transporting and depositing fillers (e.g., particles and fibers). Herein, as a preliminary experiment, for simplicity, the flow speed is set to zero as a special case for rapidly testing the concept of FB-PAM. FIGS. 6*a-h* show that the static FB can apparently allow the PhotoMC process to capture fibers from the FB and embed the grabbed fibers into the printed matrix part, providing an evidence of the feasibility and potentiality of the invented FB-PAM method. Generally, a mobile FB will unlock a more capable control of the filler deposition in FB-PAM and thus the microstructure of resulting composites. As can be seen from the microscope images, the FB-PAM printed composites display nonuniform particle distribution (aggregation, etc.) and rough geometry. To enhance the composite quality, suitable surfactants need be identified and applied to the particles and the process conditions (e.g., FB channel, flow speed, light intensity, and stage speed) need to be optimized.

All patents, patent applications, provisional applications, and publications referred to or cited herein are incorporated by reference in their entirety for all purposes.

It should be understood that the examples and embodiments described herein are for illustrative purposes only and that various modifications or changes in light thereof will be suggested to persons skilled in the art and are to be included within the spirit and purview of this application and the scope of the appended claims.

REFERENCES

1. Gibson, I., D. W. Rosen, and B. Stucker, *Additive Manufacturing Technologies:* 3D Printing, Rapid Prototyping, and Direct Digital Manufacturing. 2nd ed. 2014: Springer-Verlag New York. XXI, 498.
2. Janusziewicz, R., et al., *Layerless fabrication with continuous liquid interface production*. Proceedings of the National Academy of Sciences, 2016. 113(42): p. 11703-11708.
3. Shusteff, M., *Volumetric Additive Manufacturing of Polymer Structures by Holographically Projected Light Fields*, in Department of Electrical Engineering and Computer Science. 2017, Massachusetts Institute of Technology.
4. Kelly, B. E., et al. *Computed Axial Lithography for Rapid Volumetric* 3*D Additive Manufacturing*. in *Solid Freeform Fabrication Symposium—An Additive Manufacturing Conference*. 2017. Austin, TX.
5. Ge, Q., et al., *A digital light processing* 3*D printer for fast and high-precision fabrication of soft pneumatic actuators*. Sensors & Actuators: A. Physical, 2018. 273: p. 285-292.
6. Medellin, A., et al., *Vat Photopolymerization* 3*D Printing of Nanocomposites: A Literature Review*. Journal of micro and nano-manufacturing, 2019. 7(3).
7. Löwa, N., et al., 3*D-printing of novel magnetic composites based on magnetic nanoparticles and photopolymers*. Journal of Magnetism and Magnetic Materials, 2019. 469: p. 456-460.
8. O'Masta, M. R., et al., *Additive manufacturing of polymer—derived ceramic matrix composites*. Journal of the American Ceramic Society, 2020.
9. Lu, L., P. Guo, and Y. Pan, *Magnetic-Field-Assisted Projection Stereolithography for Three-Dimensional Printing of Smart Structures*. Journal of Manufacturing Science and Engineering, 2017. 139(7).
10. Lu, L., et al., *Acoustic Field-Assisted Particle Patterning for Smart Polymer Composite Fabrication in Stereolithography*. 3D printing and additive manufacturing, 2018. 5(2): p. 151-159.
11. Shin, S. H., et al., *An ultraviolet and electric field activated photopolymer-ferroelectric nanoparticle composite for the performance enhancement of triboelectric nanogenerators*. Nanoscale, 2018. 10(45): p. 20995-21000.
12. Yang, Y., et al., *Electrically assisted* 3*D printing of nacre-inspired structures with self-sensing capability*. Science Advances, 2019. 5(4): p. eaau9490.
13. Yunus, D. E., et al., *Shear induced alignment of short nanofibers in* 3*D printed polymer composites*. Nanotechnology, 2016. 27(49): p. 495302.
14. Thielicke, W. and E. J. Stamhuis, *PIVlab—Towards User-friendly, Affordable and Accurate Digital Particle Image Velocimetry in MATLAB*. Journal of Open Research Software, 2014. 2.
15. Walker, D. A., J. L. Hedrick, and C. A. Mirkin, *Rapid, large-volume, thermally controlled* 3*D printing using a mobile liquid interface*. Science, 2019. 366(6463): p. 360-364.

What is claimed is:

1. A method of additive manufacturing for creating an item, comprising:

(a) forming a flow bed (FB) comprising a first mixture of a flowing stream or layer of a first carrier fluid, wherein the FB comprises one or more fillers;

(b) depositing a layer of a precursor matrix fluid on top of the first mixture of the FB or below the first mixture of the FB to create an interface layer comprising a mixture of the precursor matrix fluid and fillers;

(c) delivering a light beam patterned to a current layer of the item being added through the FB and into the interface layer to cure a portion of the interface layer in a shape of the current layer of the item being added;

(d) moving the current layer of the item above or below the interface layer; and (e) repeating (c) and (d) for each successive layer of the item.

2. The method of claim 1, further comprising: adjusting one or more parameters selected from the group consisting of flow direction, flow speed, flow material type and composition of the flowing stream or layer of the FB to orient the one or more fillers in the first carrier fluid with respect to a reference point.

3. The method of claim 1, wherein the fillers comprise particles, fibers, whiskers, additives, colorants and/or other reinforcing or functional materials.

4. The method of claim 1, wherein the item created by the method of additive manufacturing comprises a multi-material component, a hybrid material, a composite material, a functionally gradient material (FGM), a ceramic matrix composite (CMC), a polymer matrix composite (PMC), or a metal matrix composite (MMC).

5. The method of claim 1, wherein the first carrier fluid comprises a fluorinated oil.

6. The method of claim 1, wherein a matrix geometry of the current layer of the item being added is controlled or adjusted by adjusting the composition and flow condition(s) of the FB to deposit one or more fillers in desired patterns in terms including composition, orientation, and/or alignment to construct the item with a desired matrix structure, complex filler architecture in terms including heterogeneity and/or topology, and/or proper filler/matrix interfacial bonding.

7. The method of claim 1, wherein the FB flows over a light window through which the light beam passes and wherein the FB provides an isolating zone that reduces or eliminates adhesion between the current layer of the item being added and the light window thereby enhancing a speed at which the item is produced.

8. The method of claim 1, wherein the FB serves as a cooling medium to dissipate exothermal heat from the curing of the current layer of the item being added.

9. The method of claim 1, further comprising:

replacing and/or replenishing the precursor matrix fluid after the current layer of the item being added is cured.

10. The method of claim 1, further comprising:

rotating a materials chamber containing the precursor matrix fluid and the FB after the current layer of the item being added is cured in order to change an orientation of the fillers in the FB with respect to the fillers in the current layer just added to the item.

11. The method of claim 1, wherein the FB comprises the first a mixture of the first carrier fluid and the one or more fillers prior to step (c) and the first carrier fluid only during step (c) while the current layer of the item being added is cured by the light beam.

12. The method of claim 1, wherein the precursor matrix fluid comprises one or more of a preceramic polymer, a photopolymer, a photoinitiator, a binding monomer/oligomer, and precursor matrix material which may comprise a preceramic polymer for ceramic matrix, a matrix monomer/oligomer, and/or a metal-crosslinked hydrogel.

13. The method of claim 1, wherein the FB comprises one or more constituents selected from filler surfactants, functional groups, and/or one or more additives, to enhance the performance of the method of additive manufacturing for creating an item and/or the properties and functionalities of resulting products.

14. The method of claim 1, wherein the FB flows into and out of a materials chamber in which the method of additive manufacturing for creating an item is carried out.

15. The method of claim 14, wherein an electric pump is used to move the flow of the FB into and out of the materials chamber and to continuously replenish the FB.

16. The method of claim 1, wherein a density of the precursor matrix material is smaller or greater than that of the FB and the precursor matrix material is immiscible with the FB, so that the FB can settle beneath or above the interface layer.

17. The method of claim 1, wherein a continuous filler or filament feeding process is used to fabricate continuous filler composites, long filler composites or continuous fiber composites included in the first mixture.

18. The method of claim 1, wherein the flow bed is programmed to transport, at one or more predetermined intervals, different ones of the one or more fillers and/or one or more carrier fluids different from the first carrier fluid to enable depositing different fillers into the matrix.

* * * * *